United States Patent [19]

Futamura et al.

[11] Patent Number: 4,800,248
[45] Date of Patent: Jan. 24, 1989

[54] ELECTRICAL DISCHARGE MACHINING APPARATUS WITH DISCHARGE CURRENT CONTROL

[75] Inventors: Shoji Futamura, Kawasaki; Masaki Kurihara, Tokyo, both of Japan

[73] Assignee: Institute of Technology Precision Electrical Discharge Works, Japan

[21] Appl. No.: 137,502

[22] Filed: Dec. 21, 1987

[30] Foreign Application Priority Data

Dec. 22, 1986 [JP] Japan ................... 61-305935

[51] Int. Cl.⁴ ............................................. B23H 1/02
[52] U.S. Cl. .................... 219/69 S; 219/69 P
[58] Field of Search ................... 219/69 S, 69 P, 69 C

[56] References Cited

U.S. PATENT DOCUMENTS

| 3,778,579 | 12/1973 | Takarada | 219/69 S |
| 4,460,815 | 7/1984 | Bell, Jr. et al. | 219/69 P |
| 4,700,038 | 12/1987 | Dauw | 219/69 C |

FOREIGN PATENT DOCUMENTS

| 52197 | 5/1982 | European Pat. Off. | 219/69 C |
| 2942549 | 4/1981 | Fed. Rep. of Germany | 219/69 P |
| 205228 | 11/1984 | Japan | 219/69 C |
| 61-25722 | 2/1986 | Japan | 219/69 C |

Primary Examiner—A. D. Pellinen
Assistant Examiner—Geoffrey S. Evans
Attorney, Agent, or Firm—McGlew and Tuttle

[57] ABSTRACT

A discharge machining apparatus adapted to permit the supply of discharge current to be cut off without increasing electrode consumption. Arrangements are made to gradually increase the level of discharge current, rather than maintaining the current level of discharge pulse. By doing so, electrode consumption becomes independent of the pulse width of the discharge pulse, so the discharge current can be cut off immediately after an abnormal state such as short circuiting or an instantaneous interruption of the discharge current occurs, eliminating the danger of deteriorating the quality of the machining surface of a workpiece.

7 Claims, 8 Drawing Sheets (Prior Art)

ELECTRICAL DISCHARGE MACHINING APPARATUS WITH DISCHARGE CURRENT CONTROL

BACKGROUND OF THE INVENTION

1. Field of the Invention

This invention relates generally to a discharge machining apparatus for machining a workpiece by electrical discharge into desired dimensions and surface roughness, and more particularly to a discharge machining apparatus adapted to realize improvements in electrode consumption and in the surface quality of the machining surface.

2. Description of the Prior Art

In a discharge machining apparatus in which a workpiece is machined by electrical discharge caused by applying a d-c voltage across an electrode and the workpiece, the electrode is inevitably worn out so long as discharge is maintained. It has been experimentally confirmed that there is a relationship as shown in FIG. 5 among the period in which a discharge current flows as a d-c voltage is applied in the form of pulses, or the width of the discharge current pulse; the value of discharge current; and the amount of electrode consumption. In other words, if the discharge current value $I_p$ is constant, the lower the discharge current pulse width the higher becomes electrode consumption. And, if the discharge current pulse width is constant, the higher the discharge current value $I_p$ the higher becomes electrode consumption.

In a discharge machining apparatus of a conventional type, therefore, a discharge voltage pulse V and a discharge current pulse I are usually set as shown in FIG. 4. That is, discharge machining is performed by setting the discharge current value $I_p$ and the discharge current ON duration $T_{ON}$ at such values that electrode consumption can be minimized within a permissible range where energy can be maintained at a level required for discharge machining. Now, supplementary description will be made, referring to waveforms shown in FIG. 4. The waveform of the discharge voltage V steeply rises at the initial stage and then lowers stepwise in the later stages because a voltage application does not necessarily initiates discharge. $S_{ON}$ refers to the duration in which a voltage is applied, i.e., the ON duration of the discharge voltage pulse, while $S_{OFF}$ to the duration in which the voltage is not applied, i.e., the OFF duration of the discharge voltage pulse. $T_{OFF}$ denotes the duration from the time when the discharge current stops flowing to the time when the next voltage is applied.

With the prior art, however, electrode consumption can be reduced so long as discharge is performed properly. In the actual discharge machining, an abnormal phenomenon, such as an instantaneous interruption of discharge current or an electrical shortcircuiting between the electrode and the workpiece. often occurs. When any of such abnormal phenomena takes place, the prior art has the following problems.

(Problems associated with the instantaneous interruption of discharge current)

The waveforms of the discharge voltage pulse V and the discharge current I when discharge is normally maintained are as shown in FIG. 4.

It sometimes happens, however, that discharge is discontinued continued for some reason, such as a sudden widening of the machining gap, reducing the discharge current to zero (i.e., leading to an instantaneous interruption).

The change in the discharge voltage pulse V and the discharge current pulse I in this case are shown in FIG. 2A. Since the ON duration of the discharge current pulse I is kept constant with the prior art, the instantaneous interruption divides the discharge current I into two parts. This means that a discharge current pulse I is divided into two successive pulses having narrower widths, with the magnitude thereof remaining unchanged. If the pulse width is reduced with the magnitude thereof kept constant, electrode consumption is increased, as described earlier, referring to FIG. 5. To avoid a successive generation of narrower-width pulses, the method of turning off the discharge current upon detection of an instantaneous interruption has been conceived. The method of merely turning off the discharge current, however, cannot prevent a narrower-width pulse having the same magnitude from being produced, though a succession of such pulses can be prevented to be sure. This method has proved unpractical because of the resulting high electrode consumption.

Furthermore, when pulses having narrow widths are kept produced successively as with the prior art, a sort of arc discharge may result. In such an arc discharge, unwanted by-products, such as tar, of machining may be deposited on the machining part, making the subsequent machining unstable and causing further instantaneous interruptions.

As described above, the prior art has a problem of accelerated electrode consumption in the event of instantaneous interruption of discharge current.

(Problems associated with electrical shortcircuiting)

An electrical shortcircuiting may occur between the electrode and the workpiece in the course of the ON duration of the discharge current pulse I due to the reduced gap between the electrode and the workpiece or other reasons. FIG. 2B shows the change in the discharge voltage pulse V and the discharge current pulse I in the event of electrical shortcircuiting. With the prior art, the discharge current pulse I is maintained for a predetermined duration, causing a shortcircuit current to flow during the period from the start of shortcircuiting to the end of the predetermined duration. This shortcircuit current may deteriorate the quality of the machining surface of the workpiece.

That is, the prior art has a problem of the deteriorated quality of the machining surface caused by the continued flow of a shortcircuit current in an electrical shortcircuiting.

As a means to overcome this problem, it may be conceived that upon detecting a shortcircuiting, the discharge current pulse I is forcibly cut off immediately to prevent a shortcircuit current from flowing. With this arrangement, however, a discharge current pulse I having a narrow width could result, increasing electrode consumption.

Consequently, a technology of eliminating an instantaneous interruption or electrical shortcircuiting, which may adversely affect discharge machining, without causing increased electrode consumption or deteriorated machining surface of a workpiece has long been desired. This invention is intended to meet such a need.

SUMMARY OF THE INVENTION

It is an object of this invention to provide a discharge machining apparatus which is adapted to cut off the supply of discharge current, in the event of an electrical shortcircuiting of electrode, or an instantaneous interruption of discharge current during discharge machining, without causing increased electrode consumption.

It is a further object of this invention to realize this object by immediately eliminating such an abnormal state as an electrical shortcircuiting or an instantaneous interruption of discharge current to prevent the quality of the machining surface of a workpiece from deteriorating.

To realize these objects, this invention comprises a discharge current value setting means for setting a discharge current value in such a manner that the discharge current value is gradually increased in accordance with the lapse of the ON duration of the discharge current pulse, an abnormal mode detecting means for detecting an electrical shortcircuiting or instantaneous interruption, and a forced cut-off means for cutting off the supply of discharge current for a predetermined duration immediately after the abnormal mode detecting means detects such an electrical shortcircuiting or instantaneous interruption.

Since the discharge current value setting means sets the discharge current value in a gradually increasing fashion, electrode consumption is not related to the length of the ON duration of discharge current pulse. Thus, the discharge machining apparatus can cut off the supply of discharge current immediately upon detecting an electrical shortcircuiting or instantaneous interruption of discharge current, preventing the surface quality of a workpiece from deteriorating.

DESCRIPTION OF THE PREFERRED EMBODIMENTS

In the following, preferred embodiments of this invention will be described in detail, referring to the accompanying drawings.

This invention has such a construction that the value of discharge current is gradually increased in accordance with the lapse of the ON duration of discharge current pulses, taking into account the relationship between the pulse width of discharge current and electrode consumption (refer to FIG. 5), and that when an instantaneous interruption of discharge current takes place, the discharge current pulse is immediately cut off for a predetermined duration.

Figure 1A:
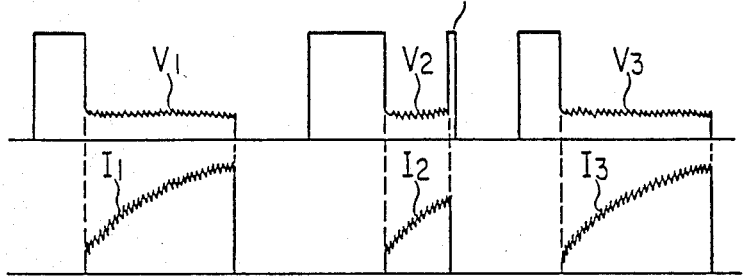
FIG. 1: Waveforms of discharge voltage and discharge current pulse in an embodiment of this invention

First, the operation of this invention will be described, referring to FIG. 1. FIG. 1A shows the state where discharge is performed normally. $V_1$ in FIG. 1A refers to a discharge voltage pulse when discharge is being performed normally, and $I_1$ to a discharge current pulse at that time, which is gradually increased with the lapse of time. Both pulses change minutely for a while after the start of discharge due to minimal changes in the state of discharge. $V_2$ i FIG. 1A refers to a discharge voltage pulse when an instantaneous interruption of discharge current has occurred, and $I_2$ to a discharge current pulse at that time. Upon detection of an instantaneous interruption of discharge current, the application of power is immediately discontinued, and resumed after the lapse of a predetermined time. $V_3$ and $I_3$ indicate discharge voltage and discharge current pulses during the next discharge.

Figure 1B:
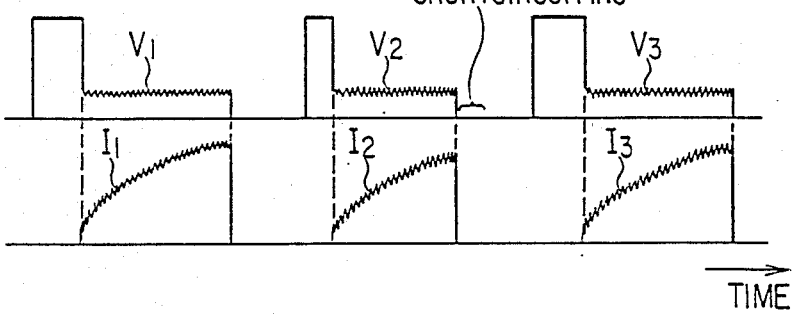
Figure 2A:
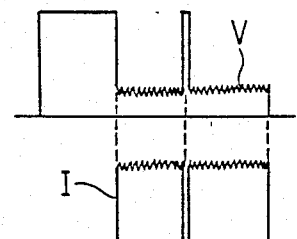
FIG. 2: Waveforms of discharge voltage and discharge current pulses with the prior art in the event of an instantaneous interruption of discharge current or an electrical shortcuiting between the electrode and the workpiece
Figure 2B:
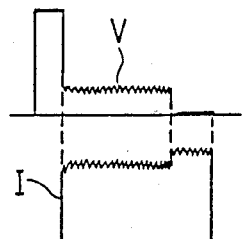
Figure 3:
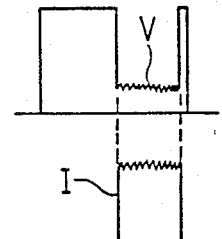
FIG. 3: Waveform when discharge current is cut off with the prior art in the event of an instantaneous interruption
Figure 4:
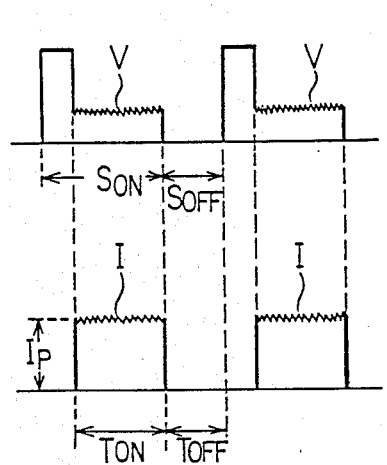
FIG. 4: Waveforms of discharge voltage and discharge current pulses with the prior art FIG. 5 Diagram of assistance in explaining the relationship between discharge current pulse width and electrode consumption

$V_2$ in FIG. 1B is a discharge voltage pulse when a shortcircuiting has occurred, and $I_2$ a discharge current pulse at that time. Upon detection of a shortcircuiting, the application of power is immediately stopped, and resumed after the lapse of a predetermined time. $V_1$ and $I_1$, and $V_3$ and $I_3$ in FIG. 1B are discharge voltage and discharge current pulses during normal discharge before and after a shortcircuiting, respectively.

Next, why the increase in electrode consumption or the deterioration of the surface quality of the workpiece caused by an electrtical shortcircuiting or an instantaneous interruption of discharge current can be prevented by employing this invention having the aforementioned construction and operation will be described.

Figure 5:
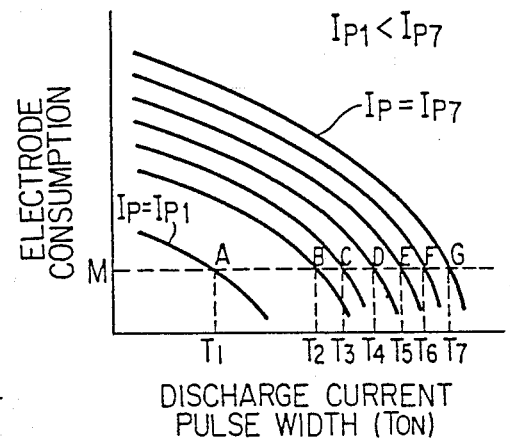

Setting the discharge current pulse in such a manner that the value of discharge current is gradually increased with the lapse of time means that the electrode consumption characteristic curve shown in FIG. 5 is shifted continuously from a curve having a small current value to another curve having a larger current value, one by one, with increases in the width of the discharge current pulse I (that is, as the coordinates advance in the direction of the abscissa axis). By selecting the time elapsed from the start of the discharge current pulse (the abscissa ($T_1$, $T_2$ ---) and the value of discharge current ($I_{P1}$, $I_{P2}$ ---) so that the trajectory of shifting points becomes parallel with the abscissa axis, as shown by dotted lines in the figure, electrode consumption is kept at all times at a predetermined value M even when the discharge current pulse is turned off at any point of time in the course of discharge.

Consequently, when the discharge current pulse is immediately cut off at any point of the discharge current pulse I, upon detection of an instantaneous interruption or a shortcircuiting, an increase in electrode consumption can be prevented. Since the discharge current pulse can be immediately cut off in the event of an instantaneous interruption of discharge current or a shortcircuiting without regard to electrode consumption, the roughening of the surface quality of the workpiece can be eliminated.

In the following, the construction of this invention will be described more specifically.

Figure 6:
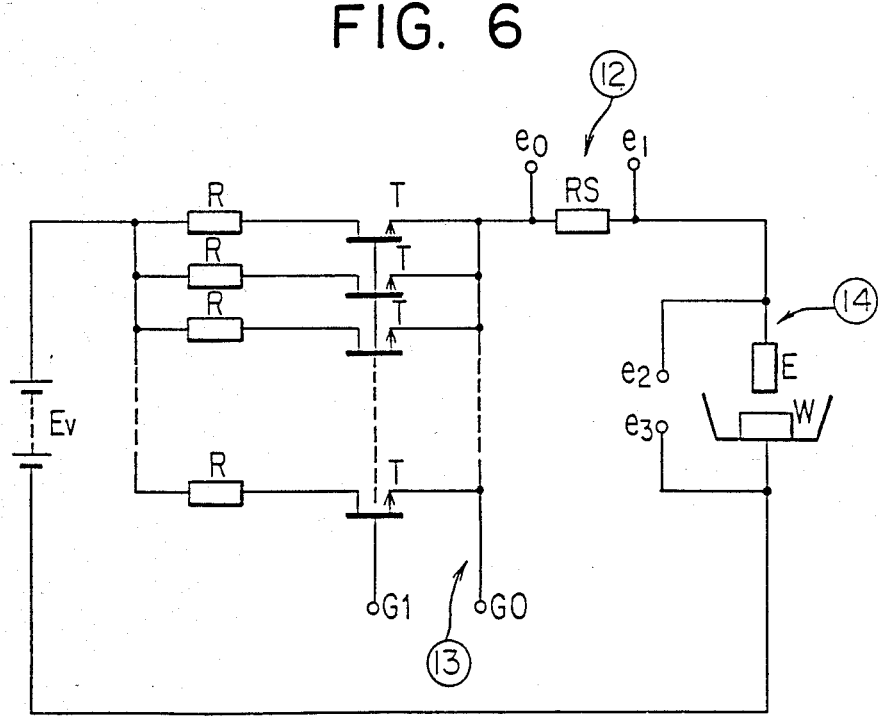
FIG. 6: Main circuit of the first embodiment of this invention

FIG. 6 shows the main circuit of a first embodiment of this invention. In FIG. 6, T indicates a transistor; R a derating resistor for the transistor T; $R_S$ a current detecting resistor (or a current detector using a Hall element); E an electrode; and W a workpiece, respectively. Each of series circuits comprising the resistors R and the transistors T almost equally shares a current, and the magnitude of the current is controlled by changing the internal resistance of the transistor T by a control signal. A control signal is produced by comparing the discharge current detecting signal detected by the current detecting resistor $R_S$ with a reference value which is set in advance so that the discharge current is increased gradually. Using the resulting control signal, the transistor T is controlled. As a result, the discharge current pulse assumes a waveform in which the current value increases gradually as desired. A control circuit for producing this control signal is shown in FIG. 7.

Figure 7:
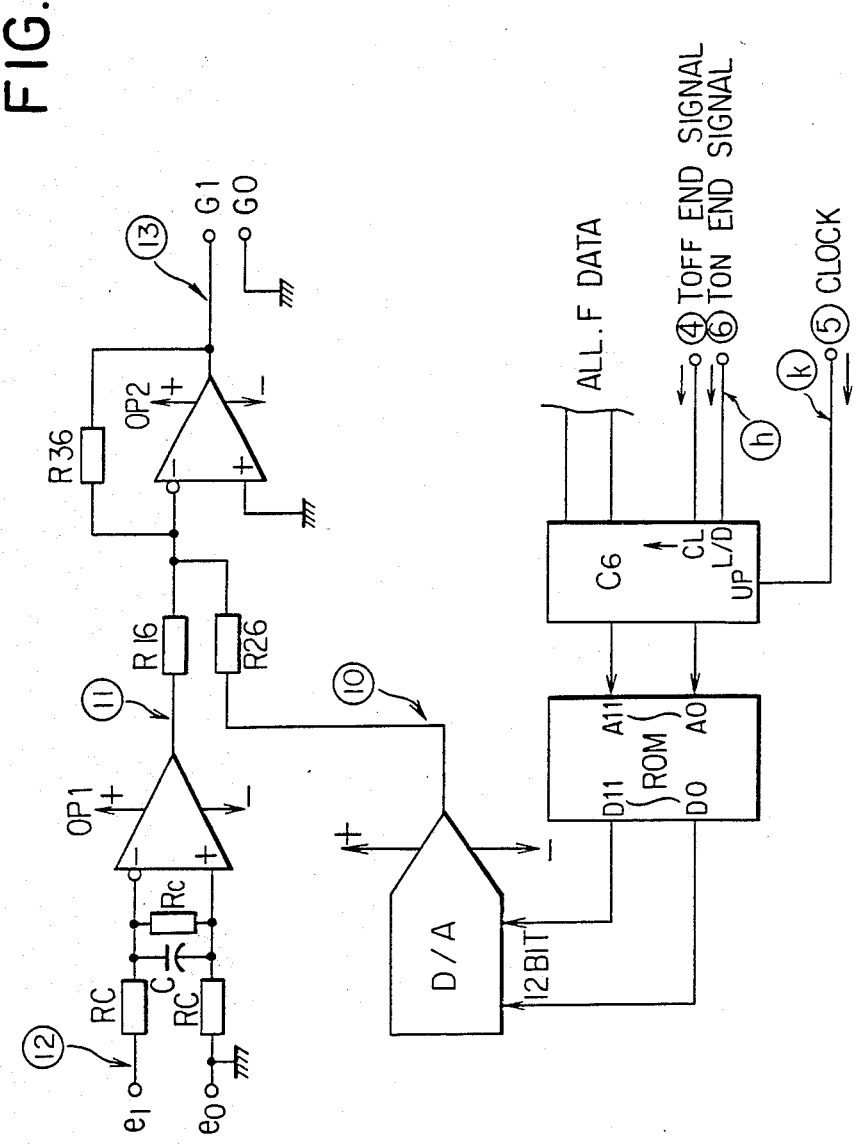
FIG. 7: Control circuit of the first embodiment of this invention
Figure 12:
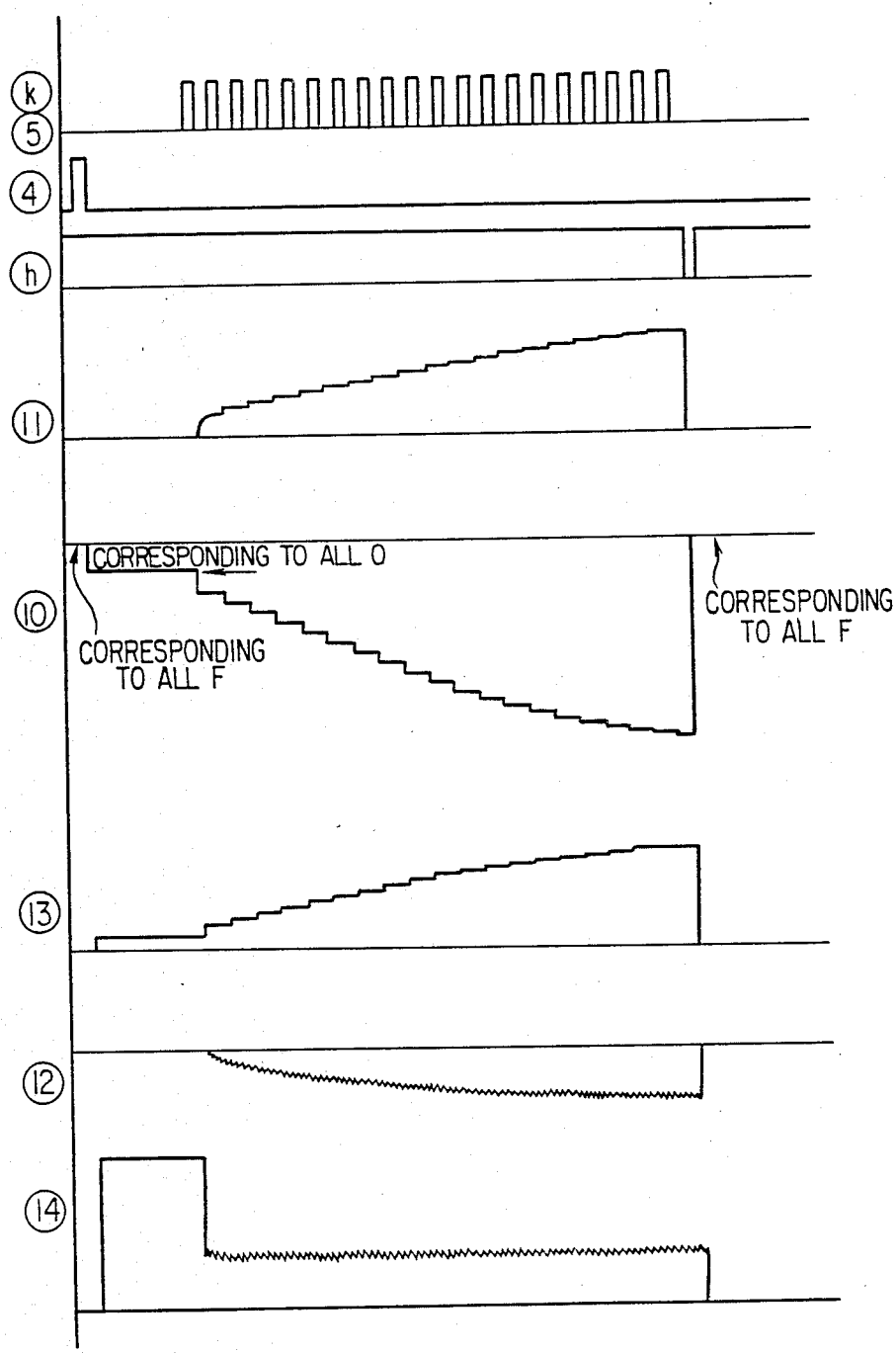
FIG. 12: Waveforms relating to FIGS. 6 and 7

In FIG. 7, $OP_1$ and $OP_2$ indicate operational amplifiers; D/A a digital/analog converter; and $C_6$ a counter, respectively. The output (⑩) of the digital/analog converter D/A is the aforementioned gradually increasing reference value, with which the discharge current detecting signal ⑫ entering from terminals $e_1$ and $e_0$ is compared, and a control signal for controlling the transistor T is transmitted from terminals $G_1$ and $G_0$. The gradually increasing reference value is produced by the digital/analog converter D/A and a ROM as the preceding stage thereof, the counter $C_6$, etc. The counter $C_6$ is caused to operate by a $T_{OFF}$ end signal ④, a $T_{ON}$ end signal ⑥, and a clock ⑤. (These signals are generated in the circuit shown in FIG. 8.) The counter $C_6$ is cleared with the $T_{OFF}$ end signal ④ prior to the start of one discharge current pulse. Then, the counter $C_6$ starts counting up seqentially by counting the clock ⑤ which is inputted as discharge begins. The ROM transmits to the digital/analog converter D/A the information on the discharge current stored in the addresses designated by the counts counted by the counter $C_6$ that counts up. In this way, a gradually increasing reference value is produced. An ALL.F data is loaded on the counter $C_6$ by the $T_{ON}$ end signal ⑥ to prevent the discharge current from flowing during the $T_{OFF}$ duration. Waveforms of the signals designated by encircled numerals and symbols in FIG. 7 are shown in FIG. 12.

Figure 8:
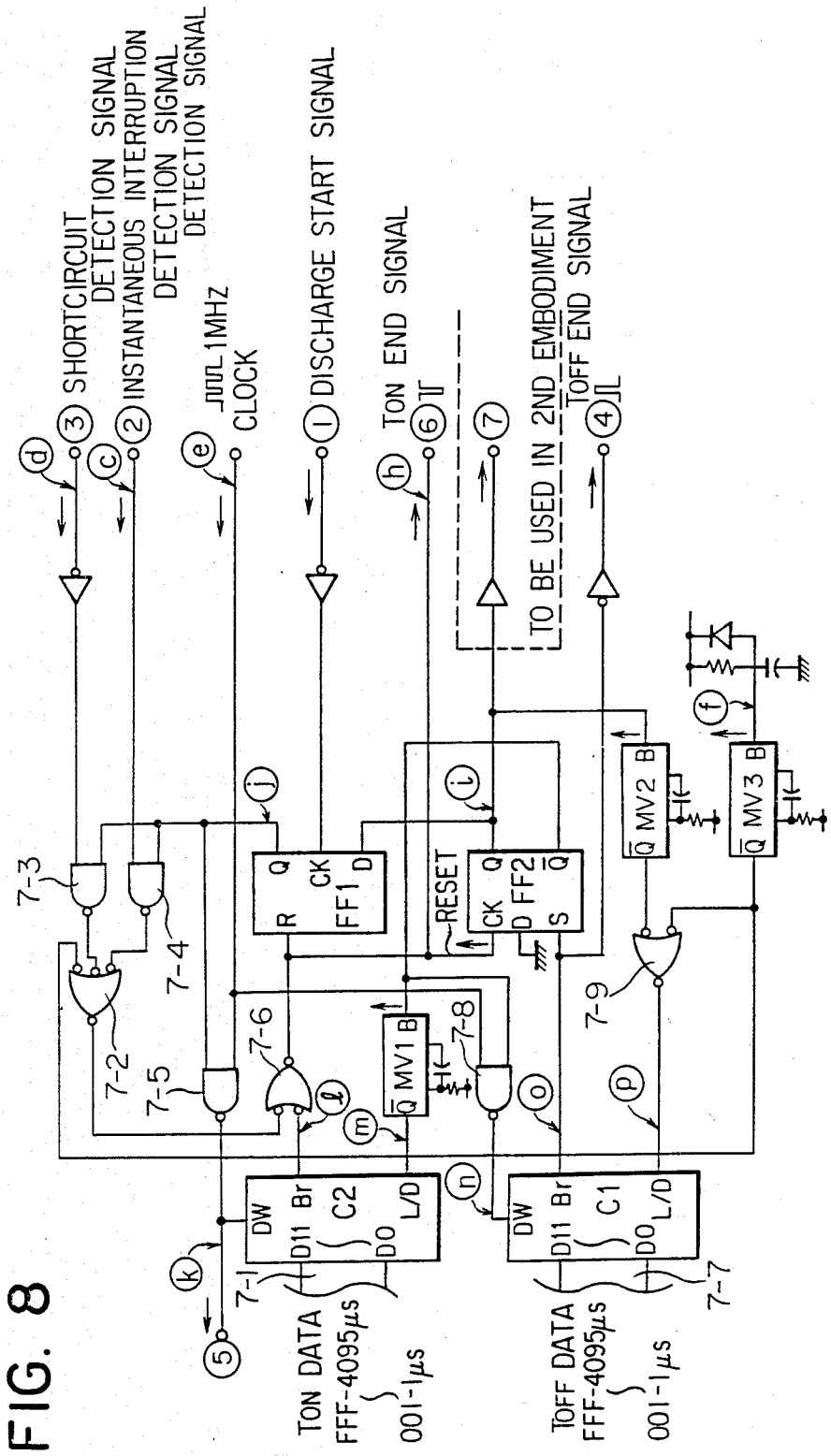
FIG. 8: Circuit for generating a control circuit signal in the first and second embodiments of this invention
Figure 9:
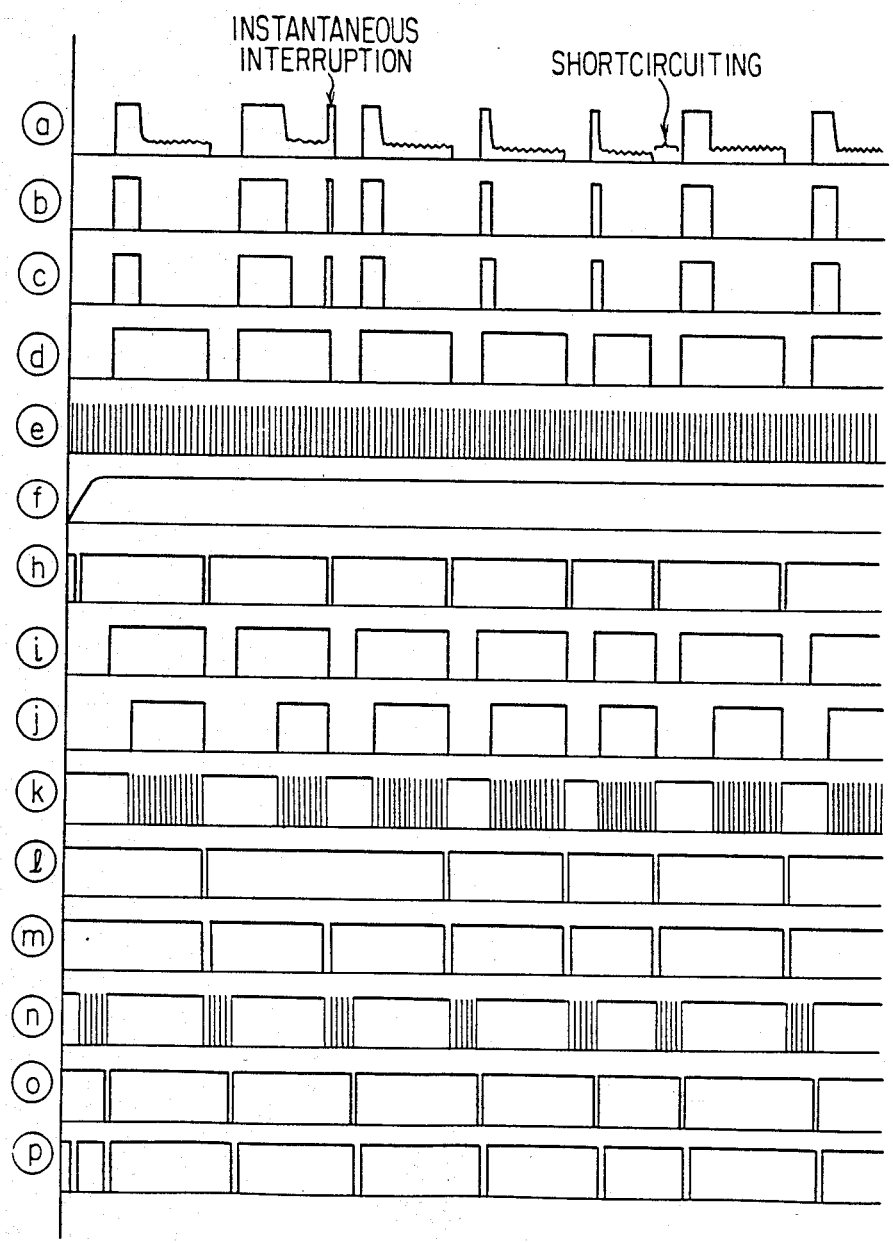
FIG. 9: Waveforms relating to FIG. 8
Figure 10:
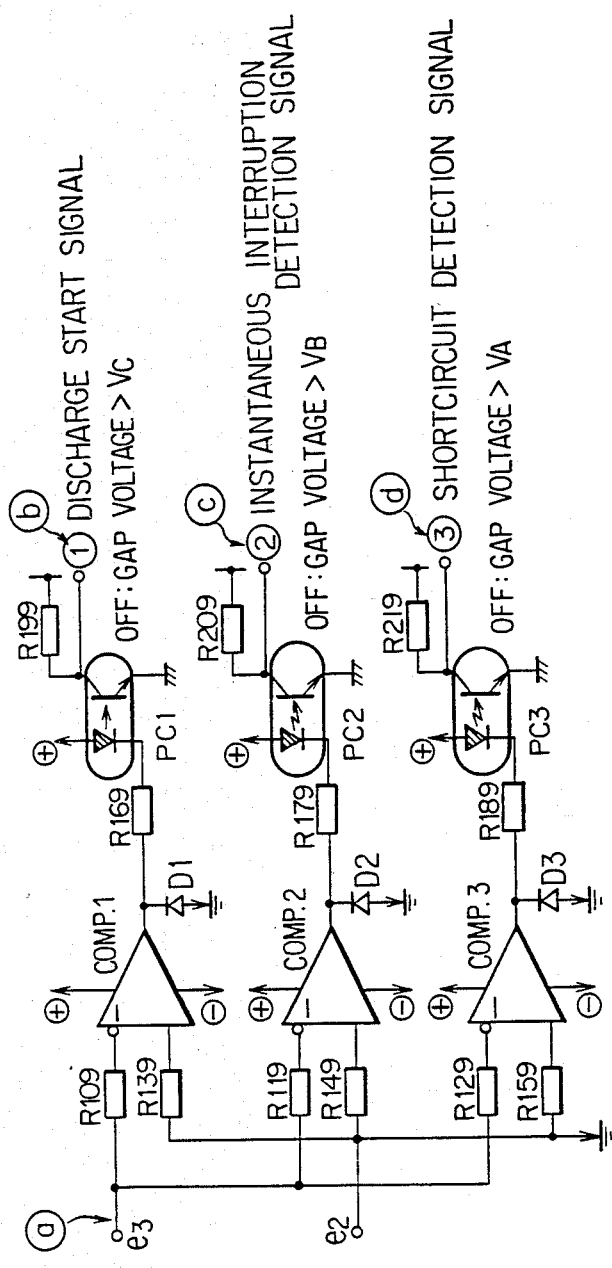
FIG. 10: Circuit for detecting the state of discharge

FIG. 8 shows a circuit for generating a control circuit signal in the first embodiment and a second embodiment, which will be described later (refer to FIGS. 13 and 14), of this invention. With reference to the first embodiment, the circuit shown in FIG. 8 is a circuit for producing the $T_{OFF}$ end signal ④, the $T_{ON}$ end signal ⑥, and the clock ⑤ required in FIG. 7. With reference to the second embodiment, the circuit shown in FIG. 8 is a circuit for producing the abovementioned signals and a signal ⑦ for telling the duration from the end of the $T_{OFF}$ duration to the end of the next $T_{ON}$ duration (that is, the duration from the $T_{OFF}$ end signal ④ to the next $T_{ON}$ duration ⑥). In FIG. 8, $C_2$ refers to a counter to which the data on the length of the $T_{ON}$ duration is set through a bus 7-1, while $C_1$ is also a counter to which the data on the length of the $T_{OFF}$ duration is set through the bus 7-7. $FF_1$ is a flip-flop for setting the $T_{ON}$ duration, and $FF_2$ is a flip-flop for setting the $T_{OFF}$ duration. $MV_1$ through $MV_3$ are multivibrators for shaping waveforms. When a discharge start signal ① enters the flip-flop $FF_1$, a logic element 7-5 is turned on by the output of the flip-flop $FF_1$, causing the clock to pass through the logic element 7-5. The clock then partly goes out through ⑤, and partly enters the counter $C_2$ to count and decrease the data set therein. When a predetermined value is reached, a signal indicating the end of the $T_{ON}$ duration ($T_{ON}$ end signal ⑥) is transmitted through a logic element 7-6. At the same time, the $T_{ON}$ end sigal is fed to the flip-flops $FF_1$ and $FF_2$. The flip-flop $FF_1$ reverses the output to turn off the logic element 7-5, preventing the clock from passing. The flip-flop $FF_2$, on the other hand, turns on the logic element 7-8, causing the clock to pass. The clock passing the logic element 7-8 decreases the data set in the counter $C_1$. When a predetermined value is reached, a signal indicating the end of the $T_{OFF}$ duration ($T_{OFF}$ end signal ④) is transmitted. At the same time, this signal is fed to the set terminal S of the flip-flop $FF_2$ to set the flip-flop $FF_2$, feeding the output thereof to the flip-flip $FF_1$. Upon receiving the output, the flip-flop $FF_1$ is put on standby in the state ready for starting the counting of the aforementioned $T_{ON}$ duration as soon as the discharge start signal ① appears. In this way, the $T_{ON}$ duration and the $T_{OFF}$ duration are set to desired lengths, and if an instantaneous interruption or a shortcircuiting occurs during discharge (that is, during the $T_{ON}$ duration), the following operations are carried out to immediately generate a $T_{ON}$ end signal ⑥ (a signal to instruct DISCHARGE END). During discharge, a signal to turn on the logic elements 7-3 and 7-4 enters the input terminals of any one of these logic elements from the flip-flop $FF_1$. When a shortcircuiting or an instantaneous interruption occurs, a shortcircuiting detecting signal ③ or an instantaneous interruption detecting signal ② enters, causing the logic element 7-2 to generate an output to transmit a $T_{ON}$ end signal ⑥ via the logic element 7-6 and trigger the flip-flop $FF_1$ to carry out the predetermined operations required to terminate the $T_{ON}$ duration. The data is set to the counters $C_1$ and $C_2$ at the time when an input enters the L/D terminal of these counters. The path containing the $MV_3$ is a path for passing a signal indicating POWER ON. At the outset of POWER ON, a signal is fed to the L/D terminal of the counter $C_1$, through the logic element 7-9 to initiate a $T_{OFF}$ duration.

ⓐ and ⓑ shown in FIG. 9 are waveforms at portions ⓐ and ⓑ shown in FIG. 10, and the remaining ones indicate waveforms at the other portions indicated by the corresponding symbols in FIG. 8.

Figure 11:
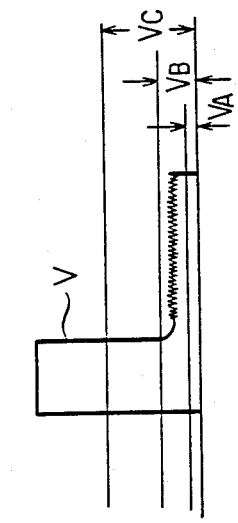
FIG. 11: Diagram of assistance in explaining the method of detecting the state of discharge

FIG. 10 shows a circuit for detecting the state of discharge for detecting, by a change in discharge voltage, whether discharge is started, or a shortcircuiting or an instantaneous interruption occurs. The discharge voltage is a voltage across the terminals $e_2$ and $e_3$ shown in FIG. 6. FIG. 11 is a diagram of assistance in explaining the method of detecting the state of discharge by means of the circuit shown in FIG. 10. V in FIG. 11 indicates a discharge voltage pulse when normal discharge is performed. The start of discharge is detected by knowing that the magnitude of the discharge voltage becomes smaller than a predetermined voltage $V_C$. An instantaneous interruption is detected by knowing that the discharge voltage becomes larger than a predetermined voltage $V_B$. And, a shortcircuiting is detected by knowing that the discharge voltage becomes smaller than a predetermined voltage $V_C$. The circuit shown in FIG. 10 performs the abovementioned detecting operations. A discharge voltage is applied to the terminals $e_2$ $l$ and $e_3$, as described above. Comparators COMP1 through COMP3 compare the discharge voltage with predetermined voltages $V_C$ through $V_A$, and generate a discharge start signal ①, an instantaneous interruption detecting signal ② and a shortcircuiting detecting signal ③. These signals are used in the circuit shown in FIG. 7.

FIG. 12 is a diagram illustrating waveforms relating to FIGS. 6 and 7. The waveforms indicated by encircled numerals and symbols in FIG. 12 are waveforms at portions designated by the corresponding numerals and symbols shown in FIGS. 6 and 7.

Figure 13:
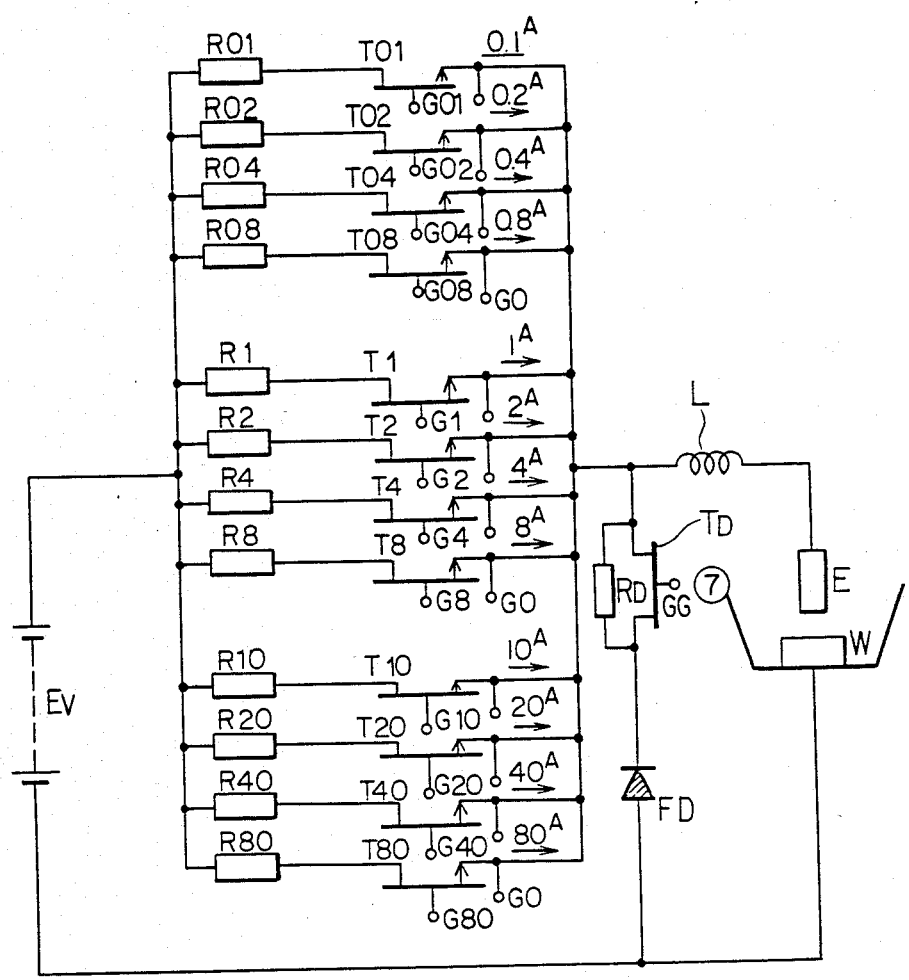
FIG. 13: Main circuit of the second embodiment of this invention
Figure 14:
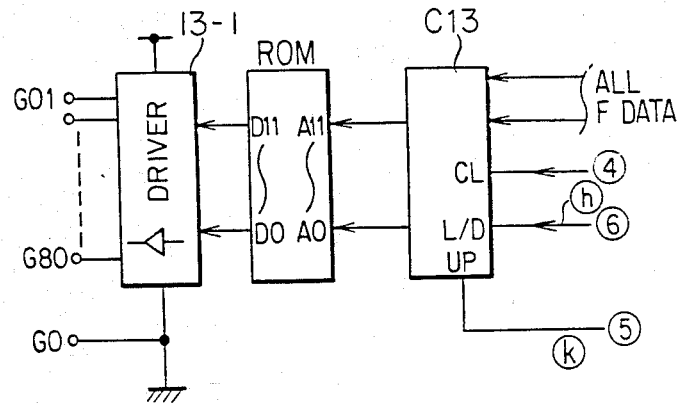
FIG. 14: Control circuit of the second embodiment of this invention
Figure 15:
FIG. 15: Diagram of assistance in explaining the operation of the resistor $R_D$ in FIG. 13

FIG. 13 shows the main circuit of the second embodiment of this invention. The first point different from the first embodiment is that control transistors $T_{01}$ through $T_{80}$ are subjected to an on-off control. The second difference is that the currents allocated to series circuits having resistors $R_{01}$ through $R_{80}$ and transistors $T_{01}$ through $T_{80}$ and comprising a control section are set to have different magnitudes for the purpose of weighting. With this arrangement, the magnitude of current is adjusted to a desired level by selecting a transistor being turned on by a control signal (the circuit for generating the control signal is shown in FIG. 14, which will be described later.) The third difference is that an inductor L, a flywheel diode FD, a damper resistor $R_D$, and a transistor $T_D$ are provided to carry out a flywheel operation in accordance with the on-off control. The flywheel operation can prevent the intermittent breaking of the discharge current at the time of current value changeover. As the control signal for the transistor $T_D$, a signal ⑦ obtained in FIG. 8 is used to keep the transistor $T_D$ turning on for a period when voltage is applied across the electrode E and the workpiece W. The damper resistor $R_D$ has a role of rapidly damping the waveform of the discharge current at the end of the $T_{ON}$ duration, as shown in FIG. 15.

FIG. 14 shows the control circuit of the second embodiment. A counter $C_{13}$ and a ROM in FIG. 14 serve the same role as the counter $C_6$ and the ROM shown in FIG. 7. On the basis of a signal fetched from the ROM, a driver 13-1 transmits a control signal to the transistors $T_{01}$ through $T_{80}$ shown in FIG. 13.

As described above, this invention makes it possible to forcibly turn off the discharge current pulse immediately after an instantaneous interruption or a shortcircuiting occurs because such a forced turning-off does not lead to an increase in electrode consumption. Consequently, the quality of the machining surface of a workpiece can be prevented from deteriorating because such a forced cutting-off does not develop into an arc discharge nor a continued flow of shortcircuit current for a long time.

What is claimed is:

1. A discharge machining apparatus having a discharge current control means for controlling a discharge current flowing between an electrode and a workpiece as a result of the application of a d-c voltage, a discharge current value setting means for setting the value of said discharge current, and a discharge current pulse width setting means for setting the pulse width of said discharge current, in which said discharge current control means carries out discharge machining by controlling said discharge current in accordance with a discharge current value set by said discharge current value setting means and a discharge current pulse width set by said discharge current pulse width setting means; characterized in that an abnormal mode detecting means for detecting an electrical shortcircuiting between said electrode and said workpiece and an instantaneous interruption of said discharge current taking place during an ON duration of said discharge current pulse, and a forced cut-off means for cutting off the supply of said discharge current for a predetermined period of time immediately after said abnormal mode detecting means detects the occurrence of said electrical shortcircuiting or said instantaneous interruption are provided; said discharge current value setting means being adapted to set a discharge current value which is gradually increased with the lapse of said discharge current pulse ON duration.

2. A discharge machining apparatus as claimed in claim ① wherein said graudally increasing discharge current value set by said discharge current value setting means is set in such a manner that said discharge current value is gradually increased so that electrode consumption remains at a constant value, independently of said discharge current pulse ON duration.

3. A discharge machining apparatus as claimed in claim ① wherein said forced cut-off means realizes the cut-off of said discharge current for a predetermined period of time, when said abnormal mode detecting means detects an electrical shortcircuiting or an instantaneous interruption, by artificially producing in said discharge current pulse width setting means a state where said discharge current pulse ON duration is terminated.

4. A discharge machining apparatus as claimed in claim 1 wherein a counter means for counting by means of a clock the progress of said discharge current pulse ON duration, and a memory means for storing a set data corresponding to said gradually increasing discharge current value in an address designated by a count counted by said counting means are provided; said gradually increasing discharge current value is set as said memory means sequentially feeds said set data stored in said designated address.

5. A discharge machining apparatus as claimed in claim 1 wherein said abnormal mode detecting means detects the occurrence of an electrical shortcircuiting or an instantaneous interruption by comparing a discharge voltage generated across said electrode and said workpiece with a predetermined reference voltage.

6. A discharge machining apparatus as claimed in claim 1 wherein said discharge current control means comprises a transistor means for controlling the supply of discharge current to said electrode, and a base potential control means for controlling the base current of said transistor means.

7. A discharge machining apparatus as claimed in claim 1 wherein said discharge current control means comprises a plurality of current generating means for generating discharge currents having different values, and a gate means for on-off controlling the supply of each discharge current generated by said current generating means to said electrode.

* * * * *